Patented Nov. 27, 1923.

1,475,477

UNITED STATES PATENT OFFICE.

CARLETON ELLIS, OF MONTCLAIR, NEW JERSEY.

PROCESS OF MAKING FATTY ACID COMPOUNDS.

No Drawing.   Application filed August 9, 1918. Serial No. 249,112.

*To all whom it may concern:*

Be it known that I, CARLETON ELLIS, a citizen of the United States, and a resident of Montclair, in the county of Essex and State of New Jersey, have invented certain new and useful Improvements in Processes of Making Fatty Acid Compounds, of which the following is a specification.

This invention relates to certain products derived from fatty acids, and to the process of making same, and relates in particular to products derived by combining fatty acids with basic nitrogen compounds such as aniline or amino and amido compounds. This application is a continuation in part of my co-pending application Serial No. 122,587, filed Sept. 28, 1916.

The fatty acids which may be employed are liquid acids such as oleic, or solid acid such as palmitic, stearic and the like. In place of the free fatty acids or mixtures of these acids, fats containing more or less free fatty acids may be employed. Thus rancid oils, such as cottonseed, fish, whale and other oils containing free fatty acid, including garbage grease and recovered fats and oils from various sources, which often contain a large proportion of free fatty acid, may be used.

In some cases, a compound of the free fatty acid with the basic organic body may be produced, and the product hydrogenated to yield a high melting point product. This is especially useful in the case of oils or fatty acids which do not hydrogenate readily, due to their acid tendencies, but which will combine with hydrogen in the presence of a catalyzer when free fatty acid is neutralized by means of the organic bases. Thus, for example, the following operations were carried out with oleic acid:

Oleic acid and aniline.

24.4 grs. aniline and 37 grs. oleic acid were heated under a reflux condenser for 4 hours at 170–190° C. The mixture darkened considerably. It was steam distilled until the distillate was free from aniline. The acid number of the steam distilled product was 30.5. It became solid on standing. The substance was treated with a solution of sodium hydroxide and washed free from alkali and sodium oleate. The acid number of the product was reduced to 3.6. The product melted at 34° C. It was dark brown in color and had a greasy feel.

Hydrogenation of the product.

The material was hydrogenated for 2 hours at 190–200° C. in the presence of 1% reduced finely-divided metallic nickel. The hydrogenated product was filtered in the hot oven. It had an iodine number of 30.5. The iodine value of the unhydrogenated substance was 69.5. The iodine value of the oleic anilide is 71.6. The product melted at 76° C. and was very hard and brittle.

Para amido phenol and oleic acid.

11 grs. para amido phenol and 28 grs. oleic acid were heated for 6 hours at 180–200° C., yielding a black waxy substance which melted at 77° C. It was soluble in most organic solvents imparting thereto a deep brown color. In alcoholic caustic potash it dissolved with a deep blue color.

A composite or compound between aniline and alcohol with stearic acid was obtained in the following manner:

2 parts of aniline and 3 parts of stearic acid were heated for four hours to 170–180° C. and after steam distilling to remove the unconverted aniline, the acid number of this product was found to be 91.5. 30 parts of this product and 30 parts of methyl alcohol were mixed and 1 part of hydrochloric acid added thereto. The mixture was boiled under a reflux condenser for about four hours and was then washed to remove the hydrochloric acid and uncombined methyl alcohol. The acid number of the product was now found to be 3.7 and the melting point was 67° C.

Ortho toluidine and oleic acid.

28 parts by weight of oleic acid and 10.7 parts of ortho toluidine were heated for four hours at a temperature of 180 to 200° C. with a reflux condenser. The product had an acid number of 77 and was steam distilled until the distillate came over free from toluidine. The substance left behind was treated with ten per cent caustic potash solution, shaken and washed free from the alkali by means of a solution of brine and was then washed with water a number of times to remove potassium oleate. The final product was distinctly crystalline and had an acid number of 2.7.

Xylidine and oleic acid.

24.7 grs. of mixed xylidines were heated with 56.2 grs. of oleic acid for five hours at a temperature of 180–195° C. employing a reflux condenser. The excess of xylidine was removed by steam distillation, and to the residue a ten per cent solution of caustic potash was added until the product was slightly alkaline. The mixture was washed with a saturated solution of salt until free from alkali and the washing was continued with water until all soap was removed. A brown oil resulted from this treatment. This was dissolved in alcohol and treated with one-tenth normal caustic potash solution until alkaline. The addition of the alkali solution precipitated a body which was washed and dried and found to have an acid number of 3.5.

Quinoline and oleic acid.

When quinoline and oleic acid are heated to 200–220° C. no material amount of combination occurs which brings about a change in the acid number.

Acetamide and oleic acid.

28.2 parts of oleic acid and 5.9 parts of acetamide were heated for four hours at a temperature ranging from 160–180° C. A black product resulted which was washed with water and dried and afforded an acid number of 150.

Diphenylamine and oleic acid.

28.2 parts by weight of oleic acid and 16.9 parts of diphenylamine were heated for four hours at a temperature ranging from 195 to 205° C. The product was steam distilled for eight hours. The diphenylamine continued to come over in the current of steam. This residue in the distillation vessel was dried and on standing for several days the amine separated from the oil in the form of plates. The oil was filtered and found to have an acid number of 198, showing that practically no reaction had taken place between the oleic acid and diphenylamine capable of causing a modification of the acid number.

Urea and oleic acid.

28.2 parts by weight of oleic acid and 6 parts of urea were heated for four hours at 200° C. A nearly solid product was obtained which was boiled with water to remove the unchanged urea and then washed with an excess of ten per cent caustic potash solution at a temperature of about 45–50° C. to remove the excess of oleic acid. The product was further washed several times with hot water until freed from alkali and soap. A crystalline body was obtained from this treatment which possessed an acid number of 9.7. Some of the product was dissolved in alkali and one-tenth normal caustic potash solution was added to the alkali solution until the mixture was faintly alkaline. Water was then added to precipitate the urea oleic acid compound, which was filtered and dried.

Beta-naphthylamine and oleic acid.

28.2 parts of oleic acid and 14.3 parts of beta-naphthylamine were heated to 180–200° C. for four and a half hours, using an air cooled reflux condenser. After this operation the product was boiled several times with water until freed from most of the unchanged beta-naphthylamine. It was then dissolved in alkali and the solution treated with dilute caustic soda solution until slightly alkaline. The beta-naphthylamine oleic acid compound was precipitated from the alkali solution by the addition of water, and in this manner a product was finally obtained having an acid number of 5.6. By repetition of this treatment a product having an acid number of 1.5 was obtained. This was a solid crystalline substance which discolored on exposure to light.

Similarly diamines such as phenylene diamine may be combined with oleic, stearic or other fatty acid.

Such amino compounds when still of an acid nature may be esterified with alcohols to form composite products.

Amino products capable of diazotization may be treated with nitrous acid and coupled with other reactive bodies to form compounds of the para amido phenol series, some of which, owing to the fatty acid radical, have a desirable degree of solubility in oils or hydrocarbons. High melting point products are obtained with, for example, aniline and stearic acid, which may be used in shoe polishes, floor dressings and polishes and for similar purposes.

The hydrogenation of the foregoing esters and amino compounds may be carried out in some cases with a nickel catalyzer employing hydrogen at ordinary pressure or at a high pressure and working at a temperature of 150 to about 200° C. In other cases the hydrogenation may be carried out at a lower temperature, employing platinum or palladium as catalyzer, and if necessary employing solvents to dissolve the ester or amino compound in order to better carry out the hydrogenation process.

When oleic acid is combined with some of the foregoing alcoholic or basic bodies and hydrogenated, the consistency of the resulting product usually differs from that obtained when stearic acid or palmitic acid is combined in like manner. The tendency of stearic acid is to form crystalline compounds while some of the oleic acid bodies after subjection to the hydrogenation step, especially after a certain degree of saturation with hydrogen, possess more of an amorphous consistency.

By the term "fatty acids" or "higher fatty acids" as used herein primarily the designation is intended to refer to acids having at least twelve carbon atoms and more particularly the acids having sixteen, eighteen and twenty carbon atoms, including oleic, stearic, palmitic, behenic acid and the like.

A further series of compounds is obtained with benzidine which may be combined with the foregoing fatty acids to form compounds of extremely high melting point.

In the foregoing illustrations reference has been made largely to oleic acid as a type of fatty acid suitable for carrying out the present process but it should be understood that stearic or palmitic acids or mixtures of these with or without oleic acid or other fatty acids of a more unsaturated character such as linoleic acid likewise may be employed. When a hard product is desired, stearic acid or a mixture of stearic and palmitic acids may be combined with aniline or other amido body to produce a high melting point saturated product without resorting to hydrogenation. On the other hand if bodies of lower melting point are desired the use of oleic or linoleic acid and the like is preferable and if the product obtained is not of satisfactory consistency, greater stiffness may be brought about by treatment with hydrogen in the manner described. The process of the present invention therefore involves two distinct features: namely, the production of a compound of an amino or amido body and a saturated fatty acid without resorting to hydrogenation, and secondly the production of a material from an amido or amino compound and a unsaturated fatty acid or product containing such fatty acid with or without treatment by hydrogenation to raise the melting point of the resulting material.

What I claim is:

1. The process of making fatty acid compounds which comprises heating aniline with oleic acid to a temperature of approximately 170 to 190° C., whereby a compound of oleic acid is formed.

2. The process of making fatty acid compounds which comprises heating a reactive amino body with oleic acid, to a temperature of approximately 170 to 190° C.

CARLETON ELLIS.